March 18, 1941.   P. M. GILMER   2,235,809
PACKING RING
Filed Aug. 3, 1938   2 Sheets-Sheet 1

Inventor
Percy M. Gilmer
By Cyrus Kehr & Sweicker
his Attorneys

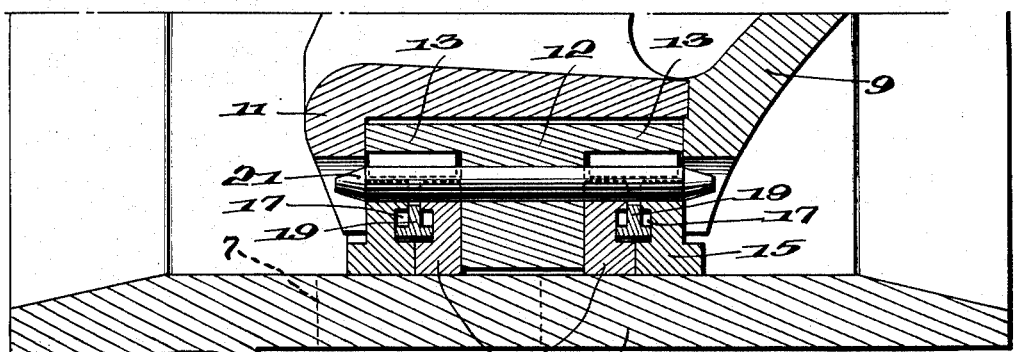

Patented Mar. 18, 1941

2,235,809

UNITED STATES PATENT OFFICE 2,235,809

PACKING RING

Percy M. Gilmer, Roanoke, Va., assignor of forty per cent to William D. Staples and James N. Kincanon Application August 3, 1938, Serial No. 222,899

4 Claims. (Cl. 309—29)

This invention relates to an improvement in packing rings, and more particularly to such rings as are used for packing valves of engines, employing steam as a motive fluid, such as locomotives, although they may be used to advantage in other engines and other relations as well.

The object of the invention is to improve the construction of such a packing ring, so that it will be more effective in use and automatically adjusted to take up for wear, may be readily applied or removed either in whole or in sections. It also reduces the number of parts required for effective packing action to a minimum, while preventing the leakage of steam past the packing rings.

This object is accomplished by utilizing sectional packing rings held in place by a retainer ring mounted therebetween with an inner connection between the retainer ring and the packing rings to hold said packing rings against undue expansion. Such packing rings are pressed outwardly by a spring that bears against the inner edges thereof.

Such a packing ring is provided at each of the steam edge and exhaust edge of the valve with a division ring therebetween. The straight side faces between the packing rings eliminates the building up of carbon in the grooves of the division ring since the retainer is in the middle and any oil in the cylinder will be wiped off at opposite edges of the packing rings rather than at the center. Outward expansion of the packing rings is permitted by a clearance between the same and the retainer ring.

I have illustrated a preferred embodiment of this invention in the accompanying drawings in which:

Fig. 3 is a similar view through the lower portion of the valve and bushing;

Fig. 4 is a cross-section thereof, approximately at right angles to Fig. 3;

Fig. 5 is a sectional view through the valve and packing substantially on the line 5—5 of Fig. 4; and Fig. 6 is a detail perspective view partly in section, of portions of the packing ring and division ring.

Figure 1:
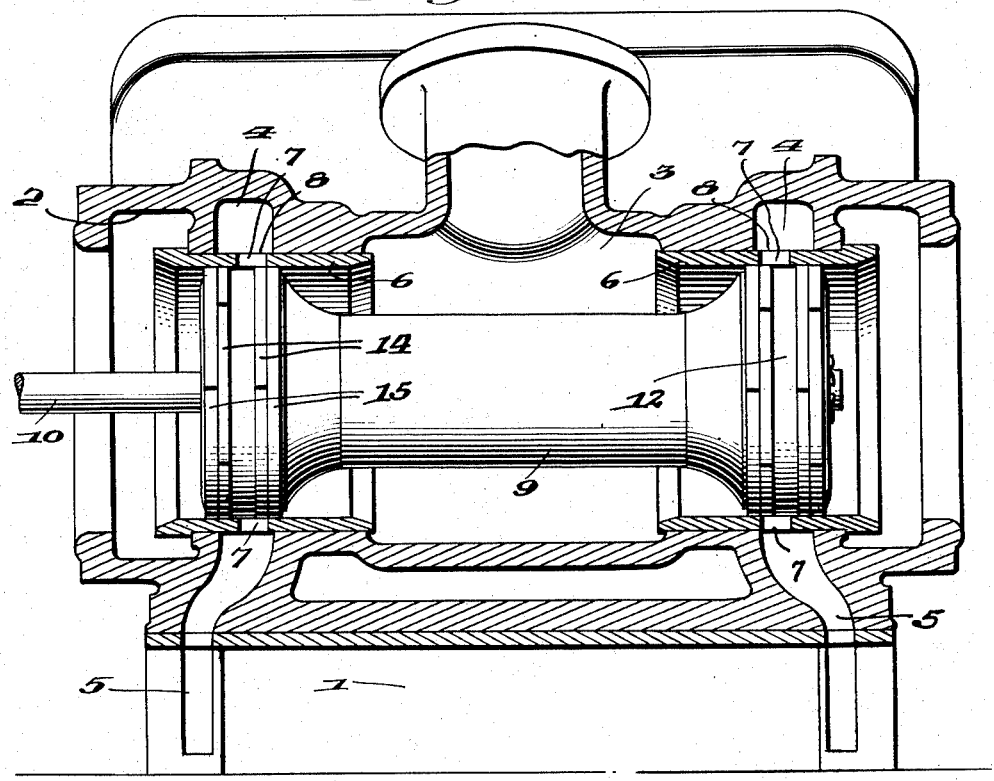
Fig. 1 is a sectional view of a portion of a steam cylinder and valve chest, with parts omitted, and showing the valve in elevation.

The invention is shown in Fig. 1 in connection with a steam cylinder, such as is used on a steam locomotive and which is designated generally by the numeral 1, with its steam chest designated 2, having a steam inlet 3, exhaust at 4, and passageways 5, leading to opposite ends of the cylinder 1. Mounted in each end of the steam chest 2, is a bushing 6, having ports 7 therein, registering with the passageways 5 and exhaust outlets 4, there being usually either six or eight ports 7 in the bushing, and separated by bridges 8 therebetween.

The valve shown is of the piston type, having a spool 9 attached to a valve stem 10 through spiders 11 at opposite ends of the spool.

Between the opposite ends of the spool 9 and the spiders 10 are sets of packing rings, one of which operates against steam pressure from the steam inlet 3, while the other set of packing rings operates against the exhaust steam to the outlets 4. These sets of packing rings are separated by a division ring 12, which is substantially T-shaped in cross-section with lateral flanges 13, extending approximately throughout the length of the space between the spider ring 11, and the opposite ends of the spool 9. This leaves a groove on each side of the division ring 12 and between the same and the adjacent side face of the spool head 9 or spider ring 11, within which the respective steam and exhaust packing rings are mounted.

The respective steam and exhaust packing ring sets are similar in structure, except that they are reversed with respect to each other, and only one will be described in detail.

Each set of packing rings comprises an inner ring 14 and an outer ring 15, each of which is made in sections with the joints staggered relative to each other, and will be made in four sections where there are eight bridges separating the ports 7 or in three sections where there are six such bridges, so that the ends of the sections will ride on bridges and will not be located at the ports 7. The packing ring 14 is in laterally abutting relation with a side face of the division ring 12, while the packing ring 15 is in abutting relation with a side face of the head of the spool 9, and is provided with a flange 16 overlapping said flange or the flange of the spider ring 11.

The opposing faces of the packing rings 14 and 15 have grooves 17 therein receiving the head 18 of a ↑-shaped retainer ring 19. This retainer ring 19 is in one piece with its inner diameter greater than the inner diameter of the packing rings 14 and 15, so as to be enclosed thereby while yet permitting expanding movement of the packing rings. A spring 20 extends approximately throughout the width of the packing rings and of the groove within which they are mounted and bears outwardly against said packing rings tending to expand the same against the inner wall of the valve bushing 6 to prevent the leakage of steam by the respective rings.

Figure 2:
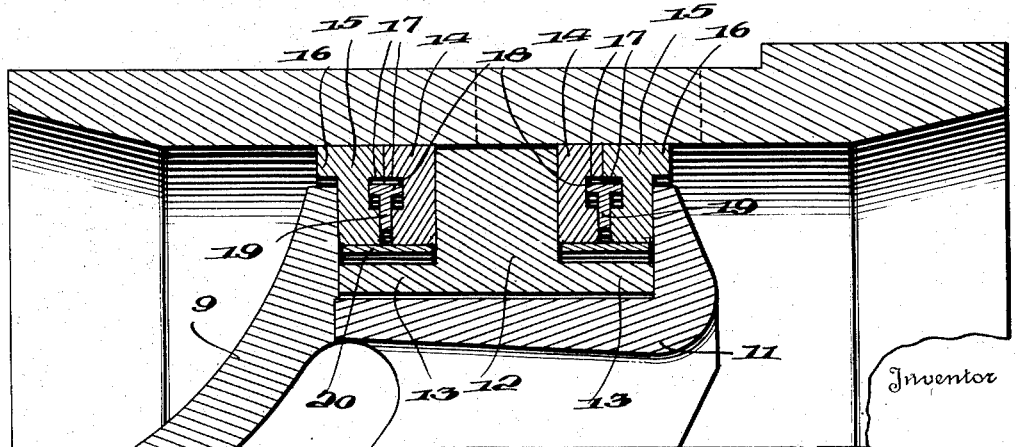
Fig. 2 is an enlarged sectional view through a portion of the valve and bushing, showing the application of the invention thereto.

In assembling the parts of the valve, the sets of packing rings will be assembled first on the flanges of the division ring 12 and then inserted thereon over the spider ring 11 and secured thereby in an assembly to the piston rod 10, ready for insertion into the bushings of the steam chest. Before insertion into the bushings, the spring 20 presses radially outward on the sectional packing rings 13 and 14, expanding the latter relative to the retainer ring 19 until the inner edges of the grooves 17 engage the under side of the head 18 of the retainer ring 19, the clearance provided by the grooves 17 then being on the outer side of the head 18. When the piston is inserted into the valve bushing 6, each set of packing rings will be compressed initially substantially as shown in Figs. 2 and 3 with the clearance provided by the grooves 17 beneath the head 18 of the retainer ring. The retainer ring 19 securely holds the sectional packing rings 14 and 15 in place in the spaces provided in the valve on opposite sides of the divisional ring 12 to facilitate assembly of the valve in passing through the bushings in the steam chest, first, through one bushing, and then another. Unless the sectional packing rings were held in place and against undue expansion, it would be difficult to insert the piston valve into the steam chest and the bushings thereof or to remove it therefrom because the sectional packing rings would hang on edges of the valve bushings toward the steam inlet 3, and interfere with the introduction or removal of the valve relative thereto.

As shown in Figs. 3 and 4, the packing ring assembly is held in proper position relative to the bushing 6 by a dowel pin 21, which is inserted through the division ring 12, the packing rings 14 and 15, and the retainer ring 19 at the lower side of the piston, which prevents these parts from turning relative to the adjacent portions of the piston through which this dowel pin extends, as shown in Fig. 3, and thereby holds the sections of the packing rings 14 and 15 with their edges riding on the bridges 8 in the bushings 6, but the staggered relation of the split ends of the packing rings provides for the assembly of these in stepwise relation. The expanding spring 20 is made in a single piece and split with its ends lying on opposite sides of the dowel pin 21 to hold this spring against turning, so that it will bear uniformly on the sections of the packing rings.

In addition to this dowel pin 21, the retainer ring 19 carries dowel pins 22, shown in Fig. 5, which are rigidly secured as by welding to the retainer ring and project into notches 23 in the packing ring 14. The purpose of this is to hold the retainer ring and packing ring against relative turning movement. After the packing rings have been used for a predetermined period of time, they will wear off at their lateral peripheral edges where the rings contact the surface of the valve bushings, but maintained packing is provided by reason of the expansion of the packing rings 14 and 15 by the spring 20 to maintain a tight fit with the bushings. Usually the clearance provided by the grooves 17 will be on the under side of the head 18 but after such wear occurs and the packing rings are moved outward by spring 20, the under sides of the grooves 17 will abut against the under side of the heads 18 and prevent further outward movement and further expansion by the spring. When this occurs, the retainer ring 19 may be removed and replaced by the retainer ring having greater inner and outer diameters and which will allow still further expansion of the packing rings before it is necessary to replace those, thus reducing the operating cost of the use of this packing. This will serve also to retain the packing rings and valve in their central positions relative to the bushings and to reline these as may be necessary.

The sectional construction of the packing rings permits the ends of the sections to ride on the bridges 8, with the joints of one ring staggered relative to the joints of the adjacent ring, whereby a stepwise relation exists between these joints by which they prevent a direct communication therethrough and also prevent a passage of steam by the packing rings either on the outer side or inner side thereof, and an effective packing is thereby maintained.

I claim:

1. A packing structure comprising expansible packing rings arranged in side-by-side relation and having mating grooves in facing sides thereof, a non-expansible completely annular retainer ring having portions received in said grooves, said packing rings having inner portions projecting inwardly of said retainer ring, and a spring overlapping the inner edges of the packing rings and bearing outwardly on said inner portions of the packing rings.

2. A packing structure comprising expansible packing rings arranged in side-by-side relation and having mating grooves in facing sides thereof, an annular non-expansible retainer ring having side portions received in said grooves and having an inner portion projecting inwardly of said grooves between the facing sides of the packing rings, said packing rings having inner portions projecting inwardly of said retainer ring inner portion, and resilient means overlapping the inner edges of the packing rings and bearing outwardly thereagainst.

3. A packing structure comprising expansible packing rings arranged in side-by-side relation and having mating grooves in facing sides thereof, a non-expansible completely annular T-shaped retainer ring having side flanges received in said grooves and having an inner flange projecting inwardly of said grooves between the facing sides of the packing rings, said packing rings having inner portions, projecting inwardly of the inner flange of the retainer ring, and a spring bearing outwardly against said inner portions of the packing rings.

4. A packing structure comprising expansible packing rings arranged in side-by-side abutting relation and having mating grooves in facing sides thereof, a non-expansible completely annular T-shaped retainer ring having side flanges received in said grooves and having an inner flange projecting inwardly of said grooves between the facing sides of the packing rings, said packing rings having inner portions projecting inwardly of the inner flange of the retainer ring, and a spring overlapping the inner edges of the packing rings and bearing outwardly against said inner portions of the packing rings, said grooves being of greater radial depth than the radial thickness of the flanges received therein to permit expansion of the packing rings relative to the retainer ring.

PERCY M. GILMER.